(No Model.) 2 Sheets—Sheet 1.
W. N. LANE.
FENCE.
No. 508,889. Patented Nov. 14, 1893.
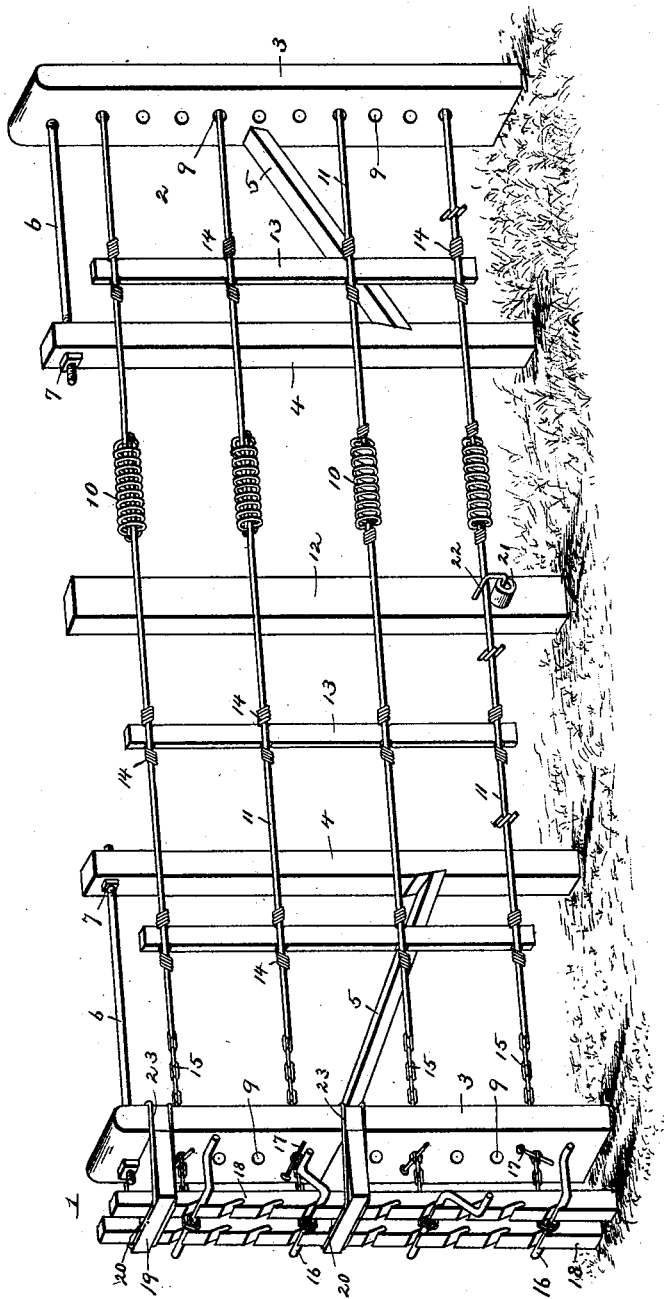
FIG. I.
Witnesses
Harry L. Ames
N. J. Riley
Inventor
Willoughby N. Lane.
By his Attorneys,
C. A. Snow & Co.

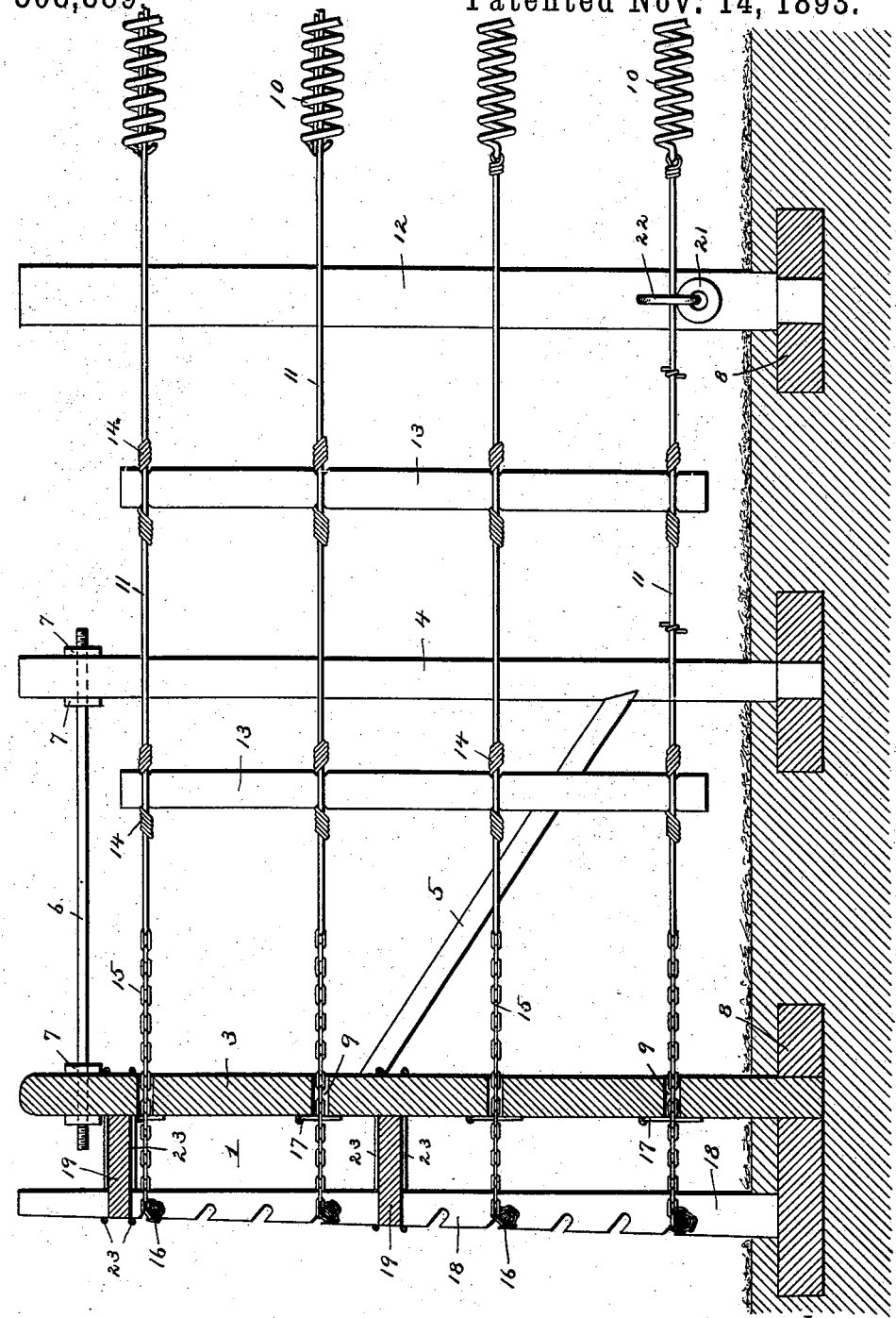

UNITED STATES PATENT OFFICE.

WILLOUGHBY NEWTON LANE, OF MOUNT STERLING, KENTUCKY.

FENCE.

SPECIFICATION forming part of Letters Patent No. 508,889, dated November 14, 1893.

Application filed April 18, 1893. Serial No. 470,884. (No model.)

*To all whom it may concern:*

Be it known that I, WILLOUGHBY NEWTON LANE, a citizen of the United States, residing at Mount Sterling, in the county of Montgomery and State of Kentucky, have invented a new and useful Fence, of which the following is a specification.

The invention relates to improvements in fences.

The object of the present invention is to improve the construction of wire fences, and to provide one in which the wires may readily be maintained at the desired tension, and which will permit the necessary contraction and expansion without breaking the wires or loosening them.

The invention consists in the construction and novel combination and arrangement of parts hereinafter fully described, illustrated in the accompanying drawings and pointed out in the claim hereto appended.

In the drawings—Figure 1 is a perspective view of a fence constructed in accordance with this invention. Fig. 2 is a vertical longitudinal sectional view of one end of the fence.

Like numerals of reference indicate corresponding parts in both the figures of the drawings.

1 and 2 designate end frames, each of which is composed of an end post 3, an upright 4, and an inclined brace, 5, extending upward from the upright to the end post and having its ends beveled and arranged in recesses of the post and the upright. The upper ends of the post and the upright are connected by a horizontal tie-rod 6 having its ends threaded and passing through the post and the upright and secured to them by nuts 7. The lower ends of the posts 3 are provided with bases 8, which are arranged in the ground and extend from opposite sides of the posts. Each of the end posts is provided with a vertical series of perforations 9; and the post of the end frame 2 has secured to it the adjacent ends of wires 11, which are provided with a series of intermediate compensating springs 10, whereby the fence wires are permitted to expand and contract without becoming loose or being broken.

The fence is supported at intervals by intermediate posts 12 and stays 13, the latter being wired to the fence wires by ties 14. The fence posts 12 are fixed in the ground similarly to the end posts, and are provided with suitable bases.

The end post of the end frame 1 has passing through its perforations 9 a series of chains 15, which are connected with the adjacent ends of the fence wires 11, and which are wound on shafts 16, and which are held to maintain the wires at the desired tension by a series of pins 17 inserted into links of the chain and arranged against the outer face of the adjacent end post 3. The shafts are journaled in suitable bearings of parallel vertical bars 18 which are fixed in the ground and provided with bases, and which are separated from the adjacent end post by horizontal blocks 19 provided in their outer ends with recesses 20 to receive the bars. The shafts may be of any desired construction and may have integral crank handles, or be provided with squared ends for the reception of a detachable crank handle or a tool for turning them. The chains may be readily wound and unwound from the shaft, and there is no liability of their breaking as would be the case were the wires wound directly on the shaft.

When barbed wires are employed the intermediate posts are provided with rollers 21 journaled on staples 22, which retain the wires in position. The rollers permit barbs to pass readily over without hooking on the staple.

The block at the top of the vertical bars 18 is secured to the adjacent post by any suitable means similarly to the lower one; and the upper ends of the vertical bars are retained in the recesses of the upper block by stay wires 23 arranged above and below the block and encircling the end post and the uprights.

It will be seen that the fence is simple and comparatively inexpensive in construction, that it is positive and reliable, and that the fence wires may be drawn to the desired tension and maintained thereat without liability of their breaking or becoming loose by contraction or expansion due to the heat of summer and the cold of winter.

Changes in the form, proportion and the minor details of construction may be resorted to without departing from the principle or sacrificing any of the advantages of this invention.

The compensating springs may be either extension or compression springs, and when the latter are employed, the wires extend through them and are secured to the farther ends thereof as shown in the drawings.

What I claim is—

In a fence, the combination of an end post provided with a series of perforations, fence wires, horizontal blocks secured to the outer face of the fence post and provided with recesses, vertical bars arranged parallel and fitting in the recesses and provided with series of bearings, shafts journaled in the bearings, chains wound around the shafts and passing through the perforations of the end post and attached to the fence wires, and pins arranged in links of the chain and located adjacent to the end post, substantially as and for the purpose described.

In testimony that I claim the foregoing as my own I have hereto affixed my signature in the presence of two witnesses.

WILLOUGHBY NEWTON LANE.

Witnesses:
JOHN C. WOOD,
J. H. WOOD.